United States Patent
Groepl et al.

(10) Patent No.: US 9,425,901 B2
(45) Date of Patent: Aug. 23, 2016

(54) CIRCUIT ARRANGEMENT AND METHOD FOR RECEIVING DIGITAL OPTICAL SIGNALS

(71) Applicant: SILICON LINE GMBH, Munich (DE)

(72) Inventors: Martin Groepl, Sonthofen Oberallgau (DE); Holger Fritsche, Heidenheim an der Brenz (DE); Holger Hoeltke, Munich (DE)

(73) Assignee: SILICON LINE GmbH, Munich (DE)

(*) Notice: Subject to any disclaimer, the term of this patent is extended or adjusted under 35 U.S.C. 154(b) by 0 days.

(21) Appl. No.: 14/552,159

(22) Filed: Nov. 24, 2014

(65) Prior Publication Data
US 2015/0162992 A1      Jun. 11, 2015

Related U.S. Application Data

(63) Continuation of application No. PCT/DE2013/200015, filed on May 22, 2013.

(30) Foreign Application Priority Data

May 22, 2012   (DE) .......................... 10 2012 104 420

(51) Int. Cl.
   *H04B 10/69*      (2013.01)
(52) U.S. Cl.
   CPC .......... *H04B 10/697* (2013.01); *H04B 10/6911* (2013.01)
(58) Field of Classification Search
   CPC ......................... H04B 10/697; H04B 10/6911
   USPC ................................................. 398/208, 210
   See application file for complete search history.

(56) References Cited

U.S. PATENT DOCUMENTS

| 6,911,921 | B2 | 6/2005 | Widmer | |
|---|---|---|---|---|
| 2003/0025562 | A1* | 2/2003 | Andreou | H03F 3/082 330/308 |
| 2003/0156774 | A1* | 8/2003 | Conradi | G02F 1/225 385/2 |
| 2009/0142074 | A1* | 6/2009 | Ide | H04B 10/695 398/202 |

(Continued)

FOREIGN PATENT DOCUMENTS

NL      EP 0629061 A1 * 12/1994 .............. H03K 5/13

OTHER PUBLICATIONS

International Search Report; PCT/DE2013/200015; Nov. 19, 2013.

(Continued)

*Primary Examiner* — Dalzid Singh
(74) *Attorney, Agent, or Firm* — Studebaker & Brackett PC

(57) ABSTRACT

In order to be able to receive any digital optical signals in the bandwidth range from zero bits per second to the high Gbits/second range with as little circuit complexity as possible and to be able to process said signals with the least possible energy requirement for reprocessing, the invention proposes a circuit arrangement as well as a method for receiving digital optical signals by means of at least one light-receiving component connected upstream of at least one signal input port, particularly by means of at least one photodiode, wherein the unipolar current signal coming from the light-receiving component through the signal input port is transformed into a bipolar current signal by means of a compensation current provided by at least one current source, the value of said current being defined by means of at least one digital register.

13 Claims, 1 Drawing Sheet

(56) References Cited

U.S. PATENT DOCUMENTS

2011/0135315 A1    6/2011    Liu et al.
2011/0135320 A1*  6/2011    Amberg ................ H04B 10/69
                                                                            398/208

OTHER PUBLICATIONS

Eduard Säckinger; "Broadband Circuits for Optical Fiber Communication"; John Wiley & Sons; 2005; pp. 130-145; 1st Edition.

* cited by examiner

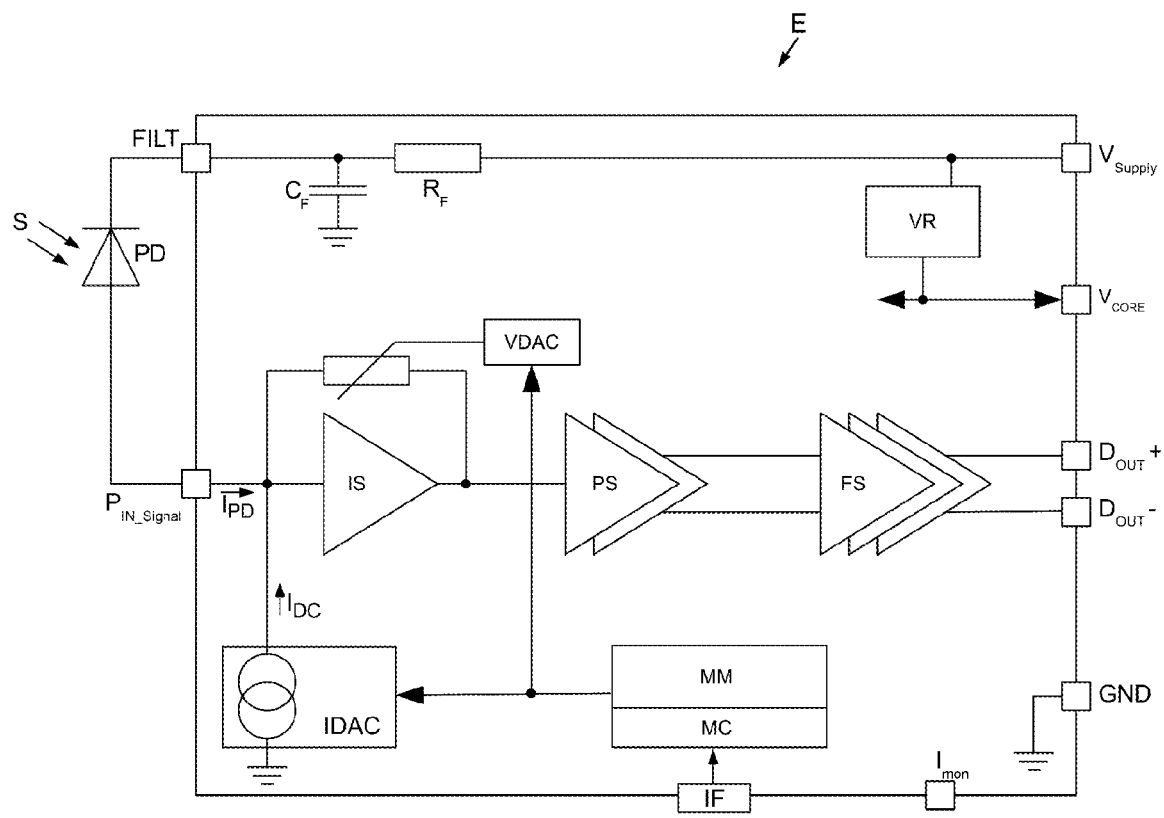

CIRCUIT ARRANGEMENT AND METHOD FOR RECEIVING DIGITAL OPTICAL SIGNALS

CROSS-REFERENCE TO RELATED APPLICATIONS

This application is a continuation of international (WO) patent application no. PCT/DE2013/200015, filed 22 May 2013, which claims the priority of German (DE) patent application no. 10 2012 104 420.1, filed 22 May 2012, the contents of each being hereby incorporated herein by reference.

FIELD OF THE INVENTION

The present invention principally relates to the technical field of serialised optical and/or electrical signal connections; more specifically, the present invention relates to a circuit arrangement as well as to a method for receiving digital optical signals.

BACKGROUND OF THE INVENTION

High-bit-rate serial connections—whether electrical or optical—as a rule require that the bit stream to be transmitted is D[irect]C[urrent]-balanced or DC-balanced. Fundamental circuit parts in such a transmission path are conceptually dependent on this property of the DC-balance of the data stream in order to function.

In order to convert any data stream, which as a rule is DC-unbalanced and thus initially not pre-conditioned for optical transmission, into a DC-balanced data stream, transcoding schemes can be employed which though technically manageable nevertheless require additional circuitry on the one hand and on the other, distinctly lower the net bit rate due to the transcoding overhead which is being created.

For example, for an overhead of twenty percent a net bitrate of five Gigabit per second (5 Gbit/s) in the protocol layer turns into a gross bitrate of six Gigabit per second (6 Gbit/s) in the physical layer.

The basis used for such 5b/6b blocks is, in the main, the instructions and the table by Albert X. Widmer (IBM Research Division). For the relevant technological background see the publication U.S. Pat. No. 6,911,921 B2 of the state of the art.

Apart from a data overhead being created the transcoding operation also increases energy consumption of the entire transmission path. With very high bitrates in particular internal data preparation accounts for a considerable share in the overall energy consumption so that the use of such transcoding schemes is not always a preferred option.

But since the data stream, which initially is not pre-conditioned for optical transmission is, as a rule, DC-unbalanced, meaning that because logical "1" and logical "0" do as a rule not occur evenly distributed in the incoming data stream during the optical transmission, conventionally used extraction methods are unable to determine unequivocally that voltage level of the incoming data stream, which defines the middle between the logical "1" and the logical "0".

The provision of a D[irect]C[urrent] current compensation for ascertaining a decision- or differentiating threshold between high optical input power (logical "1") and low optical input power (logical "0") serves the purpose of ensuring that the remaining current, i.e. the current resulting from the input current minus the DC compensation current is bipolar, i.e. has either a positive current direction (logical "1" minus DC compensation current) or a negative current direction (logical "0" minus DC compensation current).

By way of example, as regards the technological background of DC current compensation, attention may be drawn to pages 140ff of the textbook "Broadband Circuits of Optical Fiber Communication" by Eduard Säckinger, the first edition of which was published on 8 Apr. 2005 by John Wiley & Sons. In here FIG. 5.23 shows the circuit arrangement for such a DC current compensation for a differential input stage.

DC current compensation can now be automatically regulated on the basis of the input data, but this is connected with a certain amount of necessary circuitry which delays processing of the incoming signals.

OBJECTS AND SUMMARY OF THE INVENTION

Starting from the above-explained disadvantages and inadequacies as well as taking the outlined prior art into account the object of the present invention is to further develop a circuit arrangement of the above-mentioned type as well as a method of the above-mentioned type in such a way that random digital optical data streams from zero bit per second up into the high Gbit/s range are received for a minimum amount of circuitry and prepared for further processing using as little energy as possible.

This object is achieved by a circuit arrangement according to the invention with the herein described features as well as by a method according to the invention with the herein described features. Advantageous embodiments and expedient further developments of the present invention are described above and below.

This object is achieved by a circuit arrangement for receiving digital optical signals by means of at least one light-receiving component arranged upstream of at least one signal input port, in particular by means of at least one photodiode, said circuit arrangement comprising at least one digital register for defining a compensation current which can be provided by at least one current source, and by means of which a unipolar current signal coming from the light-receiving component through the signal input port can be transformed into a bipolar current signal.

This object is further achieved by an embodiment of the circuit arrangement according to the invention, wherein the compensation current can be set or adapted and/or is determined by at least one static digital signal, in particular by at least one static digital data word with, for example, a length of more than one bit.

This object is further achieved by an embodiment of the circuit arrangement according to the invention, wherein the digital register comprises
- at least one, in particular programmable and/or in particular in-circuit, memory module and/or
- at least one memory controller associated, in particular, with the memory module.

This object is further achieved by an embodiment of the circuit arrangement according to the invention, wherein the current source is configured as at least one current digital/analogue converter arranged downstream of the memory module.

This object is further achieved by an embodiment of the circuit arrangement according to the invention, comprising at least one input stage configured as a transimpedance amplifier arranged downstream of the signal input port.

This object is further achieved by an embodiment of the circuit arrangement according to the invention, comprising a voltage digital/analogue converter which is arranged downstream of the digital register, in particular downstream of the memory module, and by means of which the amplification of the input stage can be adapted, in particular controlled and/or regulated.

This object is further achieved by an embodiment of the circuit arrangement according to the invention, comprising at least one end stage arranged downstream of the input stage for providing at least one, in particular differential, output signal at output ports of the circuit arrangement.

This object is further achieved by an embodiment of the circuit arrangement according to the invention, comprising at least one preliminary stage or intermediate stage, in particular arranged downstream of the input stage and/or upstream of the end stage, said preliminary stage or intermediate stage being provided for adapting the amplitude of the signal coming from the input stage.

This object is further achieved by an embodiment of the circuit arrangement according to the invention, comprising at least one externally applied supply voltage in the range between approximately 2.5 volt and approximately 3.3 volt.

This object is further achieved by an embodiment of the circuit arrangement according to the invention, comprising by at least one voltage regulator for generating an additional supply voltage, which is smaller than the externally applied supply voltage, in particular lies between approximately 1.0 volt and approximately 1.5 volt.

This object is further achieved by a method for receiving digital optical signals by means of at least one light-receiving component PD arranged upstream of a signal input port, in particular by means of at least one photodiode, wherein the unipolar current signal coming from the light-receiving component through the signal input port is transformed into a bipolar current signal by means of a compensation current provided by at least one current source, the value of the compensation current being defined by at least one digital register.

This object is further achieved by an embodiment of the method according to the invention, wherein the signal input port is set for specific logic levels, in particular for logical "0" and/or for logical "1", of the unipolar current signal by means of at least one memory controller associated with the digital register, wherein the memory controller can access at least one, in particular programmable and/or in particular in-circuit, memory module.

This object is further achieved by an embodiment of the method according to the invention, wherein the unipolar current signal is modified by means of the current source in that the compensation current is directed or sunk from the signal input port against a reference potential, in particular against earth potential or ground potential or zero potential.

This object is further achieved by an embodiment of the method according to the invention, wherein the amplification of at least one input state configured as a transimpedance amplifier and arranged downstream of the signal input port is adapted, in particular controlled and/or regulated, by means of at least one voltage digital/analogue converter.

This object is further achieved by a use of the circuit arrangement and/or of the method according to the invention for the opto-electric transformation of high-bit-rate serial digital optical signals.

According to the invention, with a circuit arrangement as well as with a method for receiving digital optical signals by means of at least one light-receiving component arranged downstream of at least one signal input port, in particular by means of at least one photodiode, the unipolar current signal coming from the light-receiving component through the signal input port is transformed into a bipolar current signal by means of a compensation current provided by at least one current source, wherein the value of the compensation current is defined by means of at least one digital register.

With this arrangement, the present invention is based on setting and/or controlling the D[irect]C[urrent] compensation current statically, wherein this compensation current can preferably be set or adapted and/or determined by at least one static digital signal, in particular by at least one static digital data word, for example with a length of more than one bit.

By means of this static signal from the digital register at least one current source configured for example as a 9-bit programmable current digital/analogue converter or current D[igital-to-]A[nalog]C[converter] can be controlled and/or checked in such a way that the DC compensation current is provided in such a way that the unipolar current signal present at the signal input port is transformed into a bipolar current signal.

To this end the suitably sized DC compensation current signal is directed or "sunk" by means of the current DAC from the signal input port against a reference potential (GND), in particular against earth potential or ground potential or zero potential (the technical term "sunk" is derived from the English verb "to sink").

Thus, in contrast to conventional solutions the input DC current compensation is set or controlled, not in dependence of the input data, but by fixed values which are defined, in particular predefined by the digital register.

This makes it possible using the present invention, to utilise certain circuit arrangements and/or certain circuit techniques to receive random input data, i.e. random digital optical data streams in a band width range from zero bit per second up to the high Gbit/s range for a minimum of circuitry and low energy consumption.

Using the opto-electric converter according to the present invention a random digital optical data stream can be converted and prepared in such a manner as to be able to drive a differential load of for example one hundred Ohm at the output of the opto-electric converter in such a way that a differential voltage signal of for example +/−200 millivolt is provided.

According to an advantageous implementation of the present invention the digital register comprises at least one memory controller which can access at least one, in particular programmable and/or in particular in-circuit volatile or non-volatile memory module such that the memory module can be controlled and/or programmed by the memory controller.

As a result the circuit arrangement is changed with regard to characteristic details in such a way as to obtain an optical setting for specific logic levels, such as for logical "0" or for logical "1" of the input current signal at the signal input port, for example so as to obtain the, in particular, arithmetic and/or, in particular, geometric mean value between the high optical power input (logical "1") and the low optical power input (logical "0"), from which the value of the DC compensation is ascertained, which in turn is subtracted from the unipolar current input signal coming through the signal input port, in order to have the bipolar current signal available for further processing.

In a convenient embodiment of the present invention amplification (so-called TIAS gain) of at least one input stage downstream of the signal input port, which is configured as a transimpedance amplifier, can be adapted by means of at least one, for example 2-bit-programmable voltage digital/analogue converter or voltage D[igital-to-]A[nalog]C[onverter].

According to a preferred further development of the present invention one-off programming is sufficient when building the optical transmission path, in order to ensure a correct function of the opto-electric converter according to the present invention.

The circuit arrangement according to the present invention as well as the method according to the present invention represent a possibility of optically transmitting both DC signals and maximum-frequency data in an uncoded way over the same transmission channel. By means of the present invention it is possible to provide true opto couplers for highest direct Gigabit data rates.

The receiver part of the circuit arrangement as well as its mode of operation make it possible to receive, without errors, a randomly coded or uncoded, not DC-balanced serial bit stream of an optical data transmission path. In contrast to solutions from the state of the art the circuit arrangement according to the present invention as well as the method according to the present invention offer the possibility of processing a bit stream in a power-saving manner, for a distinctly reduced circuit complexity in data preparation.

Finally the present invention relates to the use of at least one circuit arrangement according to the above-described manner and/or a method according to the above-described manner for the opto-electric transformation of high-bit-rate serial digital optical signals.

BRIEF DESCRIPTION OF THE DRAWINGS

As already discussed above, there are various possibilities for embodying and further developing the teaching of the present invention in an advantageous manner. For this purpose, on the one hand reference is made to the explanations above as well as to the dependent claims, and on the other hand further embodiments, features and advantages of the present invention are explained in greater detail below, inter alia by way of the exemplary embodiment illustrated by FIG. 1.

It is shown in:
FIG. 1 in a conceptual schematic view an exemplary embodiment for a circuit arrangement according to the present invention which functions according to the method of the present invention.

DETAILED DESCRIPTION OF THE INVENTION

Digital optical signals S can be received by means of the circuit arrangement E according to the present invention, as shown in FIG. 1. To this end a light-receiving element in the form of a photodiode PD is arranged at the entry to circuit arrangement E upstream of a signal input port $P_{IN\text{-}Signal}$.

A filter input connection FILT is arranged upstream of the photodiode PD which, via a filter member comprising
- a capacitor $C_F$ and
- an ohmic resistance $R_F$ is associated with an externally applied supply voltage $V_{Supply}$, which, for example, may vary within a range between approximately 2.5 volt and approximately 3.3 volt. The capacitor plate of the filter capacitor $C_F$ facing away from the filter resistance $R_F$ is connected with a reference potential GND, in particular earth potential or ground potential or zero potential.

For generating an additional supply voltage $V_{CORE}$, which is smaller than the externally applied supply voltage $V_{Supply}$, in particular lies between approximately 1.0 volt and approximately 1.5 volt, a voltage regulator is additionally provided in FIG. 1.

Using various technical measures the circuit arrangement E, in particular an input stage IS arranged downstream of the signal input $P_{IN\text{-}Signal}$ and configured as a transimpedance amplifier is adapted to the circuit arrangement E such that random digital data streams S in a bandwidth range from zero bit per second up into the high Gbit/s-range are received with a minimum of circuitry and prepared for further processing with a minimum amount of energy consumption, wherein as a result of this preparation,
- a differential voltage signal of, for example, +/−200 millivolt can be provided and/or
- a differential load of, for example, one hundred ohm can be driven at output ports $D_{OUT}+$, $D_{OUT}-$ of the opto-electric converter E downstream of an end stage FS.

The transimpedance input stage IS is followed by a preliminary or intermediate stage PS, by means of which the amplitude of the output signal of the transimpedance input stage IS can be adapted in such a way that the amplitude of this signal increases to a maximum size, whilst the signal itself retains a high degree of signal integrity, i.e. is not noticeably afflicted through distortion by jitter.

In order to be able to define a compensation current $I_{DC}$, which can be provided by a current source IDAC and by means of which the unipolar current signal $I_{PD}$ coming from the light-receiving component PD through the signal input port $P_{IN\text{-}Signal}$ can be transformed into a bipolar current signal $I_{PD}$-$I_{DC}$, a digital register MM, MC is provided according to FIG. 1, which comprises
- a programmable in-circuit volatile/non-volatile memory module MM and
- a memory controller MC, which can access the memory module MM.

This memory controller MC, which has an interface IF associated with it for setting and/or changing digital values, is used to set the signal input port $P_{IN\text{-}Signal}$ for specific logic levels, in particular for logical "0" or for logical "1" of the incoming unipolar current signal $I_{PD}$.

In order to be able to determine and/or monitor the averaged or average unipolar current signal $I_{PD}$, a diagnostic port is associated with the circuit arrangement E, which in FIG. 1 is arranged adjacent to the interface IF.

A static digital signal in the form of a data word comprising several bits is applied by the digital register MM, MC to the current digital/analogue converter IDAC. The current digital/analogue converter IDAC converts the (digital) information contained in this data word into the (analogue) D[irect]C[urrent] compensation current $I_{DC}$; in other words the D[irect] C[urrent] compensation current $I_{DC}$ of the current digital/analogue converter IDAC is set and defined by this data word.

With the aid of this compensation current $I_{DC}$ the unipolar current signal $I_{PD}$ can be transformed by means of forming the difference (=unipolar current signal $I_{PD}$ minus DC compensation current $I_{DC}$) into a bipolar current signal, in that the compensation current $I_{DC}$ is directed, in particular sunk, from the level of the signal input $P_{IN\text{-}Signal}$ by the current digital/analogue converter IDAC in direction of the reference potential GND.

To this end the current digital/analogue converter IDAC, which for example may be 9 bit-programmable, is connected between the memory module MM of the digital register MM, MC, the signal input port $P_{IN\text{-}Signal}$ and the reference potential GND.

In addition to the current digital/analogue converter IDAC a 2-bit programmable voltage digital/analogue converter VDAC may for example be connected between the memory module MM and the input connection of the input state IS, in order to adapt, in particular to control and/or regulate, the amplification (so-called TIA Gain) of the transimpedance input stage IS.

By means of the circuit arrangement E provided as a high-speed opto coupler according to the invention, random digital data streams S, for example uncoded video signals of an optical transmission path from zero bit per second to the high Gbit/s-range, can be received.

The circuit arrangement E may for example be part of the connection of two devices in a central office environment, for example of at least one server with at least one network storage device.

LIST OF REFERENCE NUMERALS $C_F$ capacitor, in particular filter capacitor
$D_{OUT}+$ positive output port, in particular positive differential output port
$D_{OUT}-$ negative output port, in particular negative differential output port
E circuit arrangement, in particular opto-electric converter
PD light-receiving component, in particular photodiode
FILT filter output port
FS end stage
GND reference potential, in particular earth potential or ground potential or zero potential
IDAC current source, in particular current digital/analogue converter, for example 9-bit programmable current digital/analogue converter
$I_{DC}$ compensation current, in particular settable and/or adaptable and/or determined by at least one static digital signal, for example by at least one static digital data word of for example more than bit in length
IF Interface to memory controller MC
$I_{mon}$ diagnostic connection for monitoring and/or determining the averaged or average unipolar current signal $I_{PD}$
$I_{PD}$ unipolar current signal
$I_{PD}$-$I_{DC}$ bipolar current signal
IS input stage, in particular single-ended input state, for example transimpedance stage, such as a transimpedance amplifier or T[rans]I[mpedance]A[mplifier]
MC memory controller, in particular memory controller module for driving and/or programming the memory module MM
MM memory module, in particular programmable and/or in particular in-circuit memory module
$P_{IN\text{-}Signal}$ signal input port
PS preliminary stage or intermediate stage
$R_F$ ohmic resistance, in particular ohmic filter resistance
S signal, in particular digital optical signal
VDAC voltage digital/analogue converter, in particular 2-bit programmable voltage digital/analogue converter
$V_{CORE}$ additional supply voltage
VR voltage regulator
$V_{Supply}$ externally applied supply voltage While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A circuit arrangement for receiving digital optical signals by means of at least one light-receiving component connected to at least one signal input port, said circuit arrangement comprising at least one digital register for defining a compensation current which is provided by at least one current source, and by means of said circuit arrangement a unipolar current signal coming from the light-receiving component through the signal input port can be transformed into a bipolar current signal by forming a difference between the unipolar current signal and the compensation current,
wherein the digital register comprises
at least one memory module and
at least one memory controller.

2. The circuit arrangement according to claim 1, wherein the compensation current is set or adapted by at least one static digital signal.

3. The circuit arrangement according to claim 1, wherein the current source is configured as at least one current digital/analogue converter connected to the memory module.

4. The circuit arrangement according to claim 1, comprising at least one input stage configured as a transimpedance amplifier connected to the signal input port.

5. The circuit arrangement according to claim 4, comprising a voltage digital/analogue converter which is connected to the digital register and by means of which the amplification of the input stage can be adapted.

6. The circuit arrangement according to claim 1, comprising at least one end stage connected to the input stage for providing at least one output signal at output ports of the circuit arrangement.

7. The circuit arrangement according to claim 1, comprising at least one preliminary stage or intermediate stage, said preliminary stage or intermediate stage being provided for adapting the amplitude of the signal coming from the input stage.

8. The circuit arrangement according to claim 1, comprising at least one externally applied supply voltage in the range between approximately 2.5 volt and approximately 3.3 volt.

9. The circuit arrangement according to claim 8, comprising at least one voltage regulator for generating an additional supply voltage, which is smaller than the externally applied supply voltage.

10. A method for receiving digital optical signals by means of at least one light-receiving component PD connected to a signal input port, wherein the unipolar current signal coming from the light-receiving component through the signal input port is transformed into a bipolar current signal by forming a difference between the unipolar current signal and a compensation current provided by at least one current source, the value of the compensation current being defined by at least one digital register,
wherein the signal input port is set for specific logic levels of the unipolar current signal by means of at least one memory controller associated with the digital register, wherein the memory controller can access at least one memory module.

11. The method according to claim 10, wherein the unipolar current signal is modified by means of the current source in that the compensation current is directed or sunk from the signal input port against a reference potential.

12. The method according to claim 10, wherein the amplification of at least one input state configured as a transimpedance amplifier and connected to the signal input port is adapted by means of at least one voltage digital/analogue converter.

13. A circuit arrangement for receiving digital optical signals by means of at least one light-receiving component connected to at least one signal input port, said circuit arrangement comprising:

at least one digital register for defining a compensation current which is provided by at least one current source, and by means of said circuit arrangement a unipolar current signal coming from the light-receiving component through the signal input port can be transformed into a bipolar current signal by forming a difference between the unipolar current signal and the compensation current;

at least one externally applied supply voltage in the range between approximately 2.5 volt and approximately 3.3 volt; and at least one voltage regulator for generating an additional supply voltage, which is smaller than the externally applied supply voltage.

\* \* \* \* \*